United States Patent
Ramamurthy et al.

(10) Patent No.: US 9,760,986 B2
(45) Date of Patent: Sep. 12, 2017

(54) METHOD AND SYSTEM FOR AUTOMATED SHAPED COOLING HOLE MEASUREMENT

(71) Applicant: General Electric Company, Schenectady, NY (US)

(72) Inventors: Rajesh Ramamurthy, Clifton Park, NY (US); Kevin George Harding, Niskayuna, NY (US); Yi Liao, Oklahoma City, OK (US); Ratnadeep Paul, Cohoes, NY (US); Tao Jia, Glenville, NY (US); Xiaoming Du, Shanghai (CN)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/938,419

(22) Filed: Nov. 11, 2015

(65) Prior Publication Data
US 2017/0132775 A1 May 11, 2017

(51) Int. Cl.
*G06K 9/00* (2006.01)
*G06T 7/00* (2017.01)
(Continued)

(52) U.S. Cl.
CPC .......... *G06T 7/0004* (2013.01); *G06K 9/4604* (2013.01); *G06K 9/52* (2013.01);
(Continued)

(58) Field of Classification Search
USPC ........ 382/152, 154, 153, 100, 106, 128; 1/1; 367/103; 378/57, 87; 435/226, 252.3,
(Continued)

(56) References Cited

U.S. PATENT DOCUMENTS 5,125,035 A 6/1992 McCarthy et al.
6,084,827 A * 7/2000 Johnson .................. G01S 15/66
367/103
(Continued)

FOREIGN PATENT DOCUMENTS

EP 0875751 A1 11/1998
EP 1416266 B1 9/2006
(Continued)

OTHER PUBLICATIONS

U.S. Appl. No. 14/076,687, filed Nov. 11, 2013, entitled System and Methods of Generating a Computer Model of a Component.
(Continued)

*Primary Examiner* — Anh H Do
(74) *Attorney, Agent, or Firm* — Pabitra K. Chakrabarti

(57) ABSTRACT

An automated measurement system includes multi-axis imager configured to receive images of a workpiece wherein the images include visual information about the workpiece at a plurality of focus planes or visual information about the workpiece between at least two focus planes. The multi-axis imager is also configured to determine a point cloud of a plurality of 3 D data points wherein each of the plurality of 3 D data points represents an intersection of one of the plurality of focus planes with a surface of the workpiece or positional information of the workpiece in a de-focused area between the at least two focus planes. The multi-axis imager is further configured to determine a plurality of dimensions of features of the workpiece and compare the determined plurality of dimensions of the features to manufacturing specifications corresponding to at least some of the determined plurality of dimensions of the features.

25 Claims, 13 Drawing Sheets

(51) Int. Cl.
*G06K 9/62* (2006.01)
*G06T 7/60* (2017.01)
*G06K 9/52* (2006.01)
*G06T 17/20* (2006.01)
*G06K 9/46* (2006.01)
*G06T 15/10* (2011.01)

(52) U.S. Cl.
CPC .......... *G06K 9/6202* (2013.01); *G06T 7/0042* (2013.01); *G06T 7/0085* (2013.01); *G06T 7/60* (2013.01); *G06T 15/10* (2013.01); *G06T 17/20* (2013.01); *G06T 2200/04* (2013.01); *G06T 2207/10028* (2013.01); *G06T 2207/30164* (2013.01)

(58) Field of Classification Search
USPC ...................................................... 435/320.1
See application file for complete search history.

(56) References Cited

U.S. PATENT DOCUMENTS

| | | | |
|---|---|---|---|
| 6,909,800 | B2 | 6/2005 | Vaidyanathan |
| 7,333,218 | B2 | 2/2008 | Vaidyanathan |
| 7,388,980 | B2 | 6/2008 | Vaidyanathan |
| 7,574,035 | B2 | 8/2009 | Koonankeil |
| 7,649,976 | B2 * | 1/2010 | Georgeson ............ G01N 23/203 378/57 |
| 7,746,448 | B2 | 6/2010 | Franitza et al. |
| 8,212,179 | B2 | 7/2012 | Luketic et al. |
| 8,340,456 | B1 | 12/2012 | DaneshPanah et al. |
| 8,483,478 | B1 * | 7/2013 | Medasani ................ G06K 9/48 382/100 |
| 8,699,037 | B2 | 4/2014 | Cox |
| 8,797,398 | B2 | 8/2014 | Drescher et al. |
| 2003/0123707 | A1 | 7/2003 | Park |
| 2004/0253105 | A1 | 12/2004 | Vaidyanathan |
| 2009/0297336 | A1 | 12/2009 | Allen et al. |
| 2010/0068032 | A1 | 3/2010 | Liang |
| 2010/0124369 | A1 | 5/2010 | Wu et al. |
| 2011/0125423 | A1 | 5/2011 | Allen et al. |
| 2012/0072170 | A1 | 3/2012 | McKendrick et al. |
| 2012/0188380 | A1 | 7/2012 | Drescher et al. |
| 2013/0163849 | A1 | 6/2013 | Jahnke et al. |
| 2013/0215260 | A1 | 8/2013 | Drescher et al. |
| 2014/0033737 | A1 | 2/2014 | Wang et al. |
| 2014/0267618 | A1 | 9/2014 | Esteban et al. |
| 2014/0300728 | A1 | 10/2014 | Drescher et al. |
| 2015/0000387 | A1 | 1/2015 | Jiang et al. |

FOREIGN PATENT DOCUMENTS

| | | |
|---|---|---|
| EP | 2616799 A1 | 7/2013 |
| WO | 0208685 A2 | 1/2002 |
| WO | 2012035045 A1 | 3/2012 |
| WO | 2013127710 A1 | 9/2013 |

OTHER PUBLICATIONS

Robinson, G., "Measurement of Cooling Holes in Gas Turbine Blades using Computed Tomography," Survice Engineering Company, retrieved from website at https://www.cmsc.org/stuff/contentmgr/files/0/2bdcf766d9d5daf6e892c46153c591d3/misc/cmsc2011_wed_gh_0800_survice.pdf (18 pgs).

Shetty, D. et al., "New Approach to the Inspection of Cooling Holes in Aero-Engines," 2008 IEEE/ASME International Conference on Mechatronics and Embedded Systems and Applications, MESA 2008, Dec. 12-15, 2008, Beijing, CN, p. 129-135.

Shetty, D. et al., ICALEO 2006 Paper #1402 (Optical Inspection of Laser Drilled Cooling Holes in Jet Engine Blades), Presented at ICALEO 2006, Oct. 30-Nov. 2, 2006, Scottsdale, AZ (8 pgs).

Sanikommu, N. et al., "Detection of Breakthrough in Laser Percussion Drilling," Lasers in Engineering, vol. 17, No. 5, (2007) pp. 361-369.

Shetty, D. et al., "New approach to the inspection of cooling holes in aero-engines." Optics and Lasers in Engineering, vol. 47, No. 6 (2009): pp. 686-694.

Shetty, D. et al., "Optical Inspection of Holes in Jet Engine Blades," Proceedings of SPIE ,vol. 6382, (2006) pp. 638208-1-638208-11.

Shetty, D. et al., "New approach to the inspection of cooling holes in aero-engines." Proceedings of IMECE2006, (ASME International Mechanical Engineering Congress and Exposition), Nov. 5-10, 2006, Chicago, IL, pp. 1-7.

Markus Vincze et al.,Efficient borehole detection from single scan data, Machine Vision and Applications, Springer, Berlin, DE, Jul. 7, 2009, pp. 825-840, vol. No. 21, Issue No. 6, XP019836936, ISSN: 1432-1769.

European Search Report and Opinion issued in connection with corresponding European Application No. 16198107.1 on Mar. 28, 2017.

* cited by examiner

METHOD AND SYSTEM FOR AUTOMATED SHAPED COOLING HOLE MEASUREMENT

BACKGROUND

This description relates to automated metrology, and, more particularly, to methods and systems for generating a view plan for features to be measured, implementing the view plan to generate view data, and analyzing the view data to generate dimensional data for the features.

At least some known methods of determining whether a feature, such as, a cooling hole in a turbine blade meets dimensional requirements is to gauge the feature using a measuring tool, such as, a pin gauge. As used herein, dimensional requirements refer to size, spacing and distance characteristics of features of an object, for example, a turbine blade or other workpiece. However, cooling holes are being formed with more complex designs that require more complete hole and diffuser area mapping. Overall airflow tests are done on airfoils, but this only provides a test of the volume of air and does not necessarily provide a good mapping of the cooling performance of the holes. Various measurement methods including X-ray computed tomography (CT), in-line and triangulation laser point probes, touch probe methods, and structured light based 3-D optical methods have been attempted with only limited success. X-ray CT is able to see the holes, but does not have the resolution to map very small holes accurately enough to verify the dimensional measurements meet manufacturing or maintenance specifications. Point-probing methods, either optical or touch, require some form of mechanical scanning of the probe. The need for mechanical scanning introduces challenges in terms of access to the hole, fitting into the hole, and speed. To improve the speed using point probing, often an assumption is made that the holes are round and centered. In this manner, only a limited number of profiles need to be taken. However, this assumption may not be correct to the level of tolerance of the hole geometry needed for best cooling. Other microscopic methods using specific focus planes provide an incomplete map of the hole which can miss key transition points of interest unless the time is taken for many more focus planes.

BRIEF DESCRIPTION

In one aspect, an automated measurement system is provided. The automated measurement system includes multi-axis imager configured to receive images of a workpiece wherein the images include visual information about the workpiece at a plurality of focus planes or visual information about the workpiece between at least two focus planes. The multi-axis imager is also configured to determine a point cloud of a plurality of 3 D data points wherein each of the plurality of 3 D data points represents an intersection of one of the plurality of focus planes with a surface of the workpiece or positional information of the workpiece in a de-focused area between the at least two focus planes. The multi-axis imager is further configured to determine a plurality of dimensions of features of the workpiece and compare the determined plurality of dimensions of the features to manufacturing specifications corresponding to at least some of the determined plurality of dimensions of the features.

In another aspect, a method for automatically measuring dimensional parameters of a plurality of shaped cooling holes is provided. The method is implemented using a computer device coupled to a user interface and a memory device. The memory device includes receiving 3-D position data for points acquired from each cooling hole wherein each cooling hole includes a meter portion and a diffuser portion. The method also includes extracting free boundaries of a tessellated shape representing a surface of the meter portion and the diffuser portion, determining a free boundary of the meter portion using the extracted free boundaries, and determining an initial hole axis using the determined free boundary of the meter portion. The method also includes refining the initial hole axis using an iterative Gaussian filtering of the 3-D position data points, eliminating a meter portion axis bias from the Gaussian filtering by a secondary outlier elimination, and outputting a determined hole axis and radius.

In yet another aspect, one or more non-transitory computer-readable storage media having computer-executable instructions embodied thereon is provided. When executed by at least one processor the computer-executable instructions cause the processor to receive an electronic representation of the workpiece, determine a view plan for performing an inspection of the surface and subsurface features using the multi-axis imager and based on the received electronic representation of the workpiece. The view plan includes a determined route for viewing one or more surface and subsurface features using the multi-axis imager. The computer-executable instructions also cause the processor to position the workpiece in accordance with the view plan, acquire images of each surface and subsurface feature in the view plan at a plurality of view planes, and generate a three dimensional (3-D) point cloud of each surface and subsurface feature using the acquired images. In various embodiments, dimensions are independent components of a coordinate grid needed to locate a point in a certain defined "space." In three dimensional space, the coordinate system can locate a point using Cartesian coordinates (X, Y, Z coordinates), spherical coordinates (r, $\theta$, $\phi$), cylindrical coordinates (r, $\theta$, z), etc. In two dimensional space, for example, a surface, only two independent coordinates are needed to uniquely locate a point on the surface. The computer-executable instructions further cause the processor to determine dimensions of the surface and subsurface features using the generated point cloud.

In still yet another embodiment, a method of determining a boundary of a subsurface feature having an opening to a surface of a workpiece includes determining an expected location of the opening of the subsurface feature and determining a point cloud of a plurality of 3-D data points wherein each 3-D data point represents an intersection of one of a plurality of focus planes of an imager with a surface of the workpiece or a surface of the subsurface feature. The method also includes removing 3-D data points of the plurality of 3 D data points that are outside a distance threshold away from the opening of the subsurface feature and sorting the remaining 3-D data points of the plurality of 3-D data points along a z direction. The method further includes assigning the sorted 3-D data points to a portion of the subsurface feature based on a sorted position of the sorted 3-D data points wherein the subsurface feature includes a workpiece surface portion, a diffuser portion, and a meter portion and extracting parameters that define a shape of at least one of the workpiece surface portion, the diffuser portion, and the meter portion.

DRAWINGS

These and other features, aspects, and advantages of the present disclosure will become better understood when the following detailed description is read with reference to the accompanying drawings in which like characters represent like parts throughout the drawings, wherein.

Figure 1:
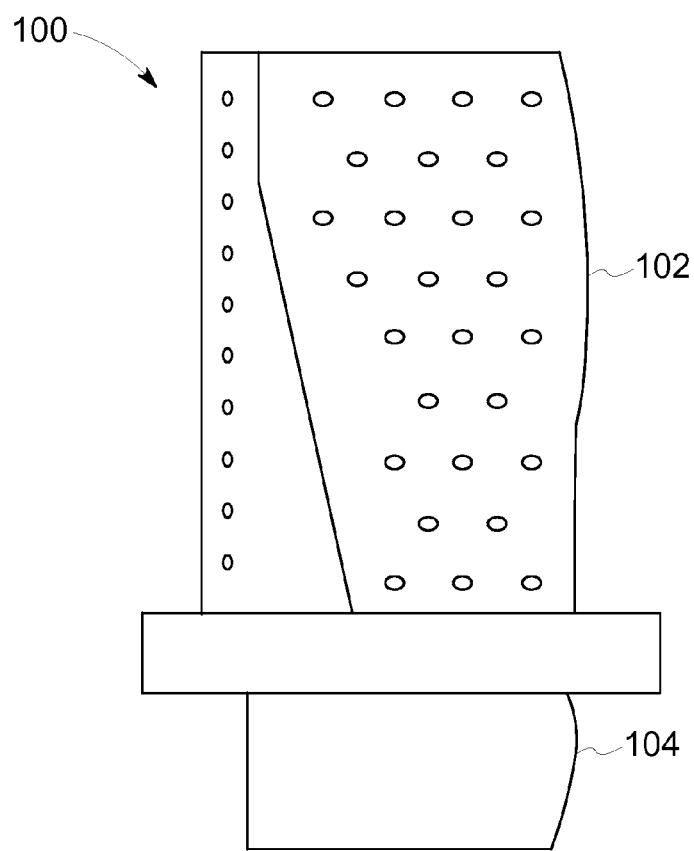
FIG. 1 is a side elevation view of an exemplary turbine engine component configured as a rotor blade.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, manufacturing specifications represent a collection of information that defines the processes, materials and methods necessary to produce a given product; including converting raw materials, components, or parts into WIPs (work-in-process) or finished goods. For example, in various embodiments, the manufacturing specification defines the process (such as laser drilling, electro-discharge machining) to produce cooling holes in a turbine component specifically or a workpiece generally, with specific geometries such as hole diameter or shape such as round, oval, or flared, angle to the surface, and position on the part.

The following detailed description illustrates embodiments of the disclosure by way of example and not by way of limitation. It is contemplated that the disclosure has general application to analytical and methodical embodiments of measuring surface features in a workpiece in industrial, commercial, and residential applications.

Embodiments of a sensor system for measuring surface features of a workpiece are described herein. The sensor system provides a method to characterize or measure key dimensional parameters of small cooling holes used in systems such as turbo-machinery. Cooling holes include a hole at some angle with respect to the surface of the part and an area around the entrance to the hole for the purpose of diffusing the air across the outer surface of the part to achieve the most effective cooling. If the cooling holes do not have the correct geometry, the airflow coming out of the holes may not follow the surface of the part but rather lift away from the part and thereby not effectively cooling the surface of the part. If the part is not cooled properly, the surface may melt or degrade quickly causing a part failure. Progress towards fabricating parts, such as, turbine blades with smaller cooling holes means that previous inspection methods do not provide a good mapping in an amount of time that is acceptable for use during a production or an overhaul inspection. Moreover, the advanced cooling hole designs mean simple pin gages do not provide enough information.

Typical hot gas component parts such as blades and nozzles of aircraft engines have hundreds of diffuser holes machined into them. To verify blue print characteristics of these machined holes, a rapid non-contact metrology system is described. Furthermore, automated computation and extraction of the design parameters from 3-D measurement data is a key enabling technology as manual analysis of 3-D optical metrology data is extremely labor intensive and not sufficiently repeatable. The feature extraction methodology, described herein, uses imaging device 528 and hole design characteristics in the development of the fully automated algorithms for computing blue print characteristics from 3-D optical metrology data. Dense data from optical or similar tools may contain a wide range of noise factors which may be actual surface texture or sensor noise, both of which can degrade the calculation of the best hole diameter and center. An iterative method is used that minimizes these noise factors to obtain a more consistent diameter and axis measurement.

Some embodiments of the disclosure employ a three-dimensional (3-D) microscope method that is based upon focus diversity methods. One such focus diversity method obtains 3-D information by stepping through a series of focus shifts, producing a series of images that include visual information for in-focus regions as well as out of focus regions wherein the visual information includes information that can be visually or optically discerned by means of the collection of light in the part of the light spectrum visible to humans. A mathematical model of the imaging system allows the in and out of focus regions to be mapped into a continuous 3-D volume, describing the (x, y, z) position of every point resolved on the part surface. This 3-D method is used to map the cooling hole, the diffusing area around the hole, and the transition points between these areas. In various embodiments, the 3-D method is implemented using a multi-axis imager configured to receive images of a workpiece wherein the images include visual information about the workpiece at a plurality of focus planes and/or visual information about the workpiece between at least two focus planes. The multi-axis imager is also configured to determine a point cloud of a plurality of 3-D data points wherein, in some embodiments, each of the plurality of 3-D data points represents an intersection of one of the plurality of focus planes with a surface of the workpiece. In other embodiments, each of the plurality of 3-D data points represents positional information of the workpiece in a de-focused area between the at least two focus planes. The 3-D data points include de-focused image information that deviates from clear or sharp focus or is not sharply defined or wherein the image of points on the feature surface that are not sharply focused. The multi-axis imager is also configured to determine, using the point cloud of the plurality of 3-D data points, a plurality of dimensions of features of the workpiece and compare the determined plurality of dimensions of the features to manufacturing specifications corresponding to at least some of the determined plurality of dimensions of the features. The multi-axis imager is further configured to output an indication of at least the comparisons that exceed a predetermined threshold.

Predetermined threshold represents a minimum, maximum, or range of values of a property to achieve some objective or purpose that is determined, decreed or decided beforehand. In one embodiment, the predetermined threshold number of 3-D points needed to define a certain shape means the minimum number of X,Y,Z points that defines a shape of a cooling hole and diffuser according to the design of that part feature. For example, in geometry two points are the minimum number of points to define a line. Three non-collinear points is the minimum number of points to define a plane, a triangle, or a circle. However, the minimum number of points to define an ellipse unambiguously is six. As a shape becomes more complex, the number of points needed to define that shape increases. In the case of a cooling hole in a workpiece, the shapes may have a circular cross section but any cross section not perpendicular to the central axis will be elliptical in shape. So in the simplest case, two points are needed to define the central axis of rotation of the cooling hole, then three more points on a plane perpendicular to the center axis line on the wall of the cooling hole are needed to define the basic shape. Cooling hole ovality (out of round shape), taper, and special features such as where the hole transitions to the surface points are all needed to define a real cooling hole.

The multi-axis imager is also configured to receive an electronic representation of a lens of the multi-axis imager and determine the plurality of 3-D data points representing positional information of the workpiece in the de-focused area between the at least two focus planes using the electronic representation of the lens. The electronic representation of the lens is typically included in a mathematical model of the imaging system stored in the imaging system or accessible to it. As used herein, the 3-D data points have a description of X, Y, and Z position information within a common coordinate frame. In various embodiments, as few as five thousand 3-D data points or greater than one-hundred thousand 3-D data points are used to characterize a cooling hole.

In operation, a model of the part and cooling hole design locations is used to identify the location and orientation of each cooling hole as well as the shape of the surrounding surface of the part. Using the part information and a model of the sensor system, including the sensor standoff requirements, measurement volume, and limitations regarding angle of view and lighting needs for the sensor, a set of optimal view angles are calculated in order to measure each hole to be measured. The objective of the view angle optimization is to capture high quality data as needed to define the hole and diffuser area geometry in as short of time as possible and within the physical access restrictions due to the geometry of the part and the geometry and standoff requirement of the sensor. This optimization may be done per each hole or can be done for a small group of holes close together. Once the view angles are determined, a manipulation or positioning device is used to position the sensor relative the hole to be measured at each angle needed to map that hole or series of holes. The manipulation device might be a robot, a coordinate movement system, or manual fixtures. A series of images are collected at each view angle from respective focus planes or view planes, each with a fixed spacing along the optical axis of the sensor. The collected images are then analyzed using the focus diversity method to generate a 3-D map of the meter portion and diffuser area. The 3-D map is used to determine the centerline of the meter portion, as well as the transition points between the meter portion bore and the diffuser area and part surface. This information is then compared against limits set in the design of the part to determine if the dimensional parameters of each cooling hole are within specification.

Experimental and analytical studies have shown that the 3-D shape of the meter portion and diffuser of cooling holes machined into hot gas components have a significant impact on their cooling performance. Dimensional inspection of the machined diffuser holes is necessary for ensuring product quality and for controlling the cooling hole manufacturing process. In particular, the 3-D shape of the cooling hole is controlled by critically toleranced dimensional features that define its shape and location on the component. Embodiments of the present disclosure also describe a methodology for automatically computing shaped cooling hole parameters from 3-D digital inspection data which may be obtained by any upstream metrology process, for example, but not limited to touch probe, 3-D optical sensors and computed-tomography (CT images). Currently, no commercial systems or technologies exist for doing fully automated rapid inspection of diffuser shaped hole geometry. Feature extraction of the measured data is a key enabling technology for the development of such systems. This disclosure describes an interactive analysis method that makes use of the design model, the sensor parameters and key boundary conditions to select and use data that best computes key parameters from diffuser 3-D measurements.

The following description refers to the accompanying drawings, in which, in the absence of a contrary representation, the same numbers in different drawings represent similar elements.

Figure 2:
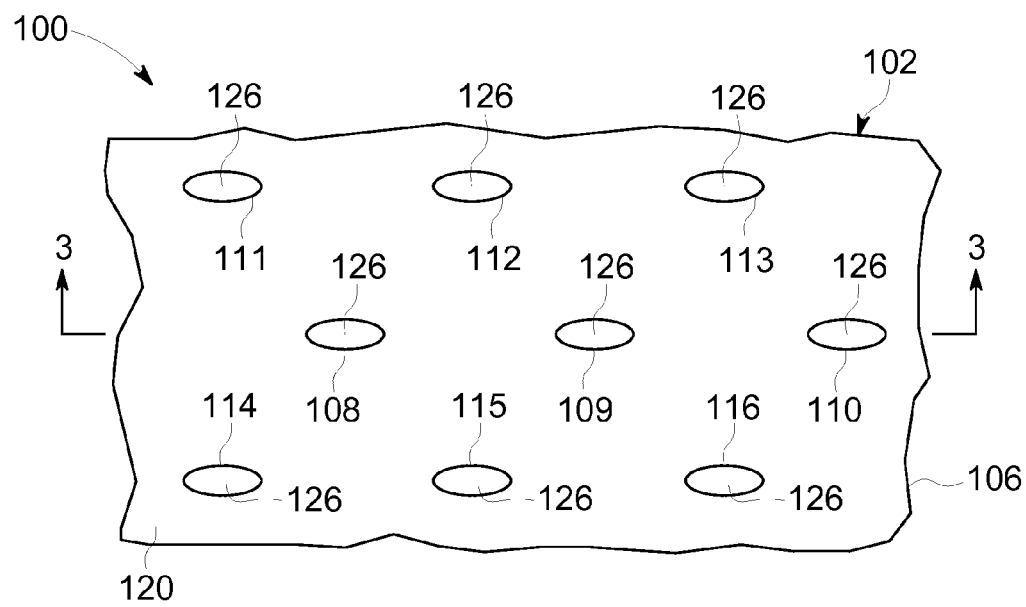
FIG. 2 is an enlarged view of a portion of the rotor blade shown in FIG. 1.
Figure 3:
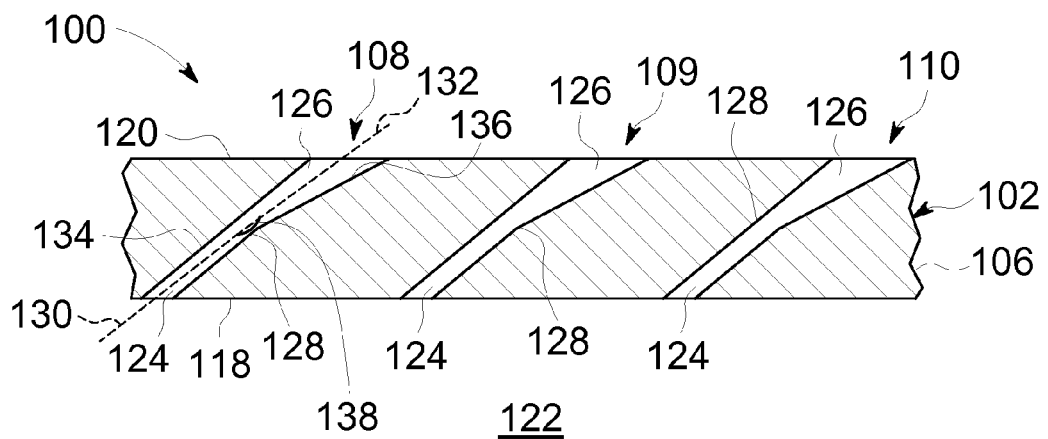
FIG. 3 is a section view of the portion of the rotor blade shown in FIG. 2.

FIG. 1 is a side elevation view of an exemplary turbine engine component configured as a rotor blade 100. In the exemplary embodiment, rotor blade 100 includes a blade airfoil 102 that is connected to (e.g., formed integral with or attached to) a blade root 104. FIG. 2 is an enlarged view of a portion of rotor blade 100. FIG. 3 is a section view of the portion of rotor blade 100. Referring to FIGS. 2 and 3, airfoil 102 includes an airfoil wall 106 with one or more cooling holes 108-116. Wall 106 includes an interior surface 118 and an exterior surface 120. Interior surface 118 may define at least a portion of an internal cavity 122 of airfoil 102. Exterior surface 120 may at least partially define a leading edge, a trailing edge, a pressure side surface or a suction side surface of airfoil 102.

One or more of cooling holes 108-116 each extends through wall 106 between interior surface 118 and exterior surface 120. One or more of cooling holes 108-116 may each include a shaped meter portion 124 and a diffuser portion 126 shaped the same or differently from meter portion 124, which is coupled in flow communication with meter portion 124 at a junction 128. In the exemplary embodiment, shaped meter (bore) portion 124 is illustrated as a cylindrically-shaped bore. However, it should be understood that meter portion 124 may have any "axi-symmetric" shape and not only a cylindrical shape. For example, the general principle of the process applies even if meter portion 124 is conical, elliptical, elliptical-conical etc. Meter portion 124 extends into wall 106 from interior surface 118 to diffuser portion 126. Diffuser portion 126 extends into wall 106 from exterior surface 120 to meter portion 124. Meter portion 124 may have a substantially uniform (e.g., cylindrical) geometry and be sized to regulate a predetermined amount of fluid flow therethrough. In contrast, diffuser portion 126 may have a (e.g., tapered cylindrical) geometry that tapers as diffuser portion 126 extends from exterior surface 120 towards meter portion 124. Diffuser portion 126 is configured to condition the fluid flow such that the flow of fluid is maintained across exterior surface 120, rather than being expelled into an ambient space away from exterior surface 120. Meter portion 124 and diffuser portion 126 each include respective centerlines 130, 132 and respective sidewalls 134, 136. In various embodiments, centerlines 130 and 132 are co-linear and in other embodiments, centerlines 130 and 132 are at an angle 138 with respect to each other.

Figure 4:
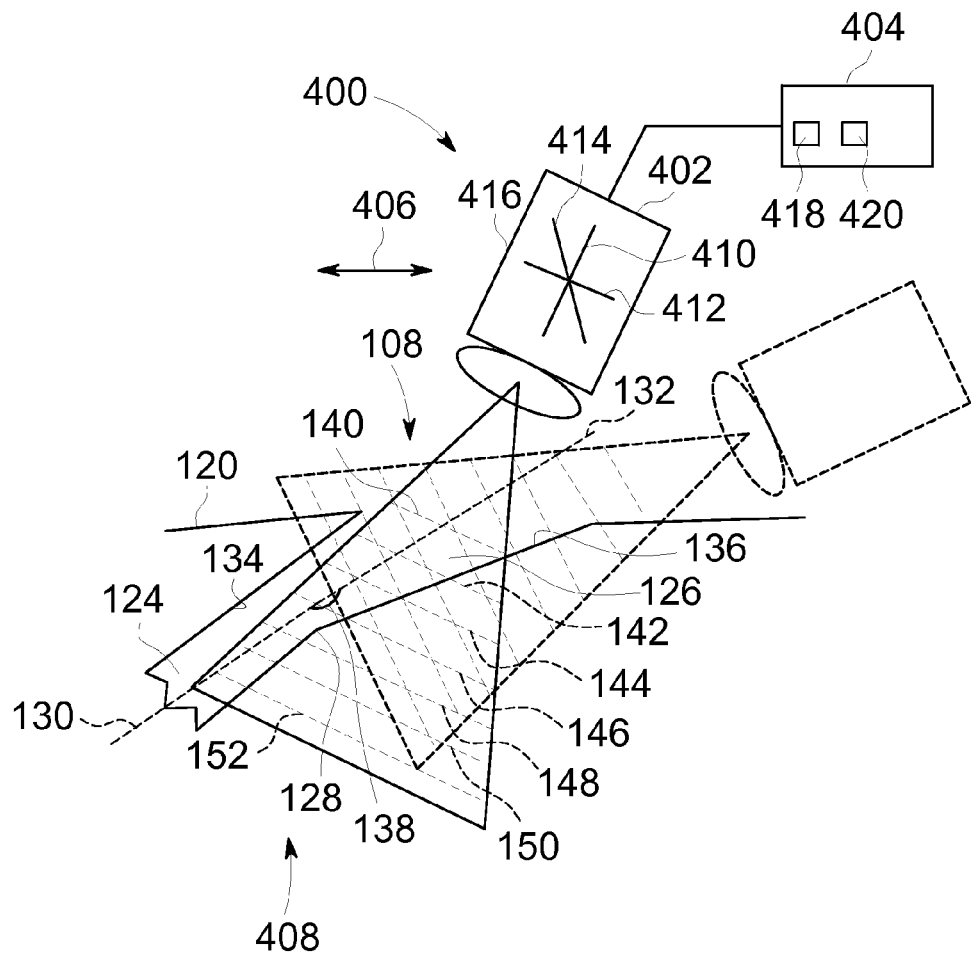
FIG. 4 is a schematic view of an automated non-contact measurement system for inspecting one or more apertures or cooling holes of a component such as the rotor blade shown in FIG. 1.

FIG. 4 is a schematic view of an automated non-contact measurement system 400 for inspecting one or more apertures or cooling holes 108-116 of a component such as rotor blade 100 (shown in FIG. 1). Measurement system 400 includes a measurement device 402, such as, but not limited to, an optical imager and a controller 404. Measurement device 402 is configured to be translated along a path 406, revolve about a point 408, and/or rotate about a plurality of axes 410, 412, and 414.

Examples of such a non-contact measurement device include, but are not limited to, a full spectrum (e.g., white) light measurement device, a monochromatic (e.g., blue) light measurement device, a laser measurement device, and a computed axial tomography scanning (CAT scan) device. Another example of a non-contact measurement device is an interferometry device, which projects and measures changes (e.g., phase shifts) in a pattern of waves (e.g., electromagnetic waves).

Measurement device 402 includes a non-contact sensor 416 (e.g., a white light optical scanner) that is adapted to map at least a portion of rotor blade 100; (e.g., one or more of the cooling holes 108-116). The term "map" may describe a process of measuring a (e.g., high density) triangulated mesh of surface 3-D data points to digitally represent a part or workpiece surface. Mapping typically includes generating a point cloud of 3-D data points that represent an intersection of a surface and a focal plane of the imager. The intersection is determined using visual information that can be visually or optically discerned by means of the collection of light in the part of the light spectrum visible to humans. A point-cloud usually contains millions of points that is a collection of scanned points and may not even contain any topological information. However, most of the topological information can be deduced by applying suitable algorithms on the point-clouds. Some of the fundamental operations performed on a scanned point-cloud include the computation of surface normals to be able to illuminate the scanned object, applications of noise-filters to remove any residual noise from the scanning process, and tools that change the sampling rate of the point cloud to the desired level. All three of these operations compute the k nearest neighbors or k-neighborhood for each point in the point-cloud.

Controller 404 is communicatively coupled (e.g., hardwired or wirelessly connected) with measurement device 402. Controller 404 may be implemented with hardware, software, or a combination of hardware and software. Controller 404 may include one or more processors 418, memory device 420, and analog and/or digital circuitry. Memory device 420 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as memory device 420, expansion memory, or memory on one or more processors 418 that may be received. Controller 404 implements a view plan, which is stored in a memory associated with or accessible to controller 404. The view plan is derived from specification data for rotor blade 100 and cooling holes 108-116 or other component being inspected and/or measured. The view plan specifies a route that controller 404 will control measurement device 402 to execute to permit optimal positioning of measurement device 402 with respect to rotor blade 100 during image acquisition. Controller 404 is also configured to compare measured position data to specification location information to verify a registration between each feature being measured and a corresponding feature in the specification data.

During operation, measurement device 402 is guided to a proximity of cooling hole 108. Measurement device 402 is configured to acquire images from one or more angles with respect to a centerline of meter portion 124 and/or diffuser portion 126. Cooling hole 108 is viewed from slight angles with respect to centerlines 130, 132 so that sidewalls 134, 136 of cooling hole 108 are visible to measurement device 402 and trading off a consideration of how much resolution is obtainable versus a view area of cooling hole 108. Measurement device 402, when properly positioned, acquires images at a plurality of view planes or focal planes 140-152. Measurement device 402 necessarily moves in the course of acquiring these images. Measurement device 402 acquires an image, and then measurement device 402 moves toward exterior surface 120 a small amount, for example, approximately two microns, then measurement device 402 acquires another image, and repeats such movement and acquisition for a predetermined number of images. Non-contact measurement system 400 compares characteristics of the acquired images with the model data for the corresponding cooling hole to verify the images are of the same cooling hole that non-contact measurement system 400 has positioned under measurement device 402. If the acquired images and the model data correspond within a predetermined tolerance, measurement device 402 assumes the imaged cooling hole is the proper cooling hole for the image acquisition. Non-contact measurement system 400 progresses to the next cooling hole specified in the view plan. In various embodiments, images from the same angle can be used to measure both meter portion 124 and diffuser portion 126. In some embodiments, images are acquired from different angles to measure meter portion 124 and diffuser portion 126.

Figure 5:
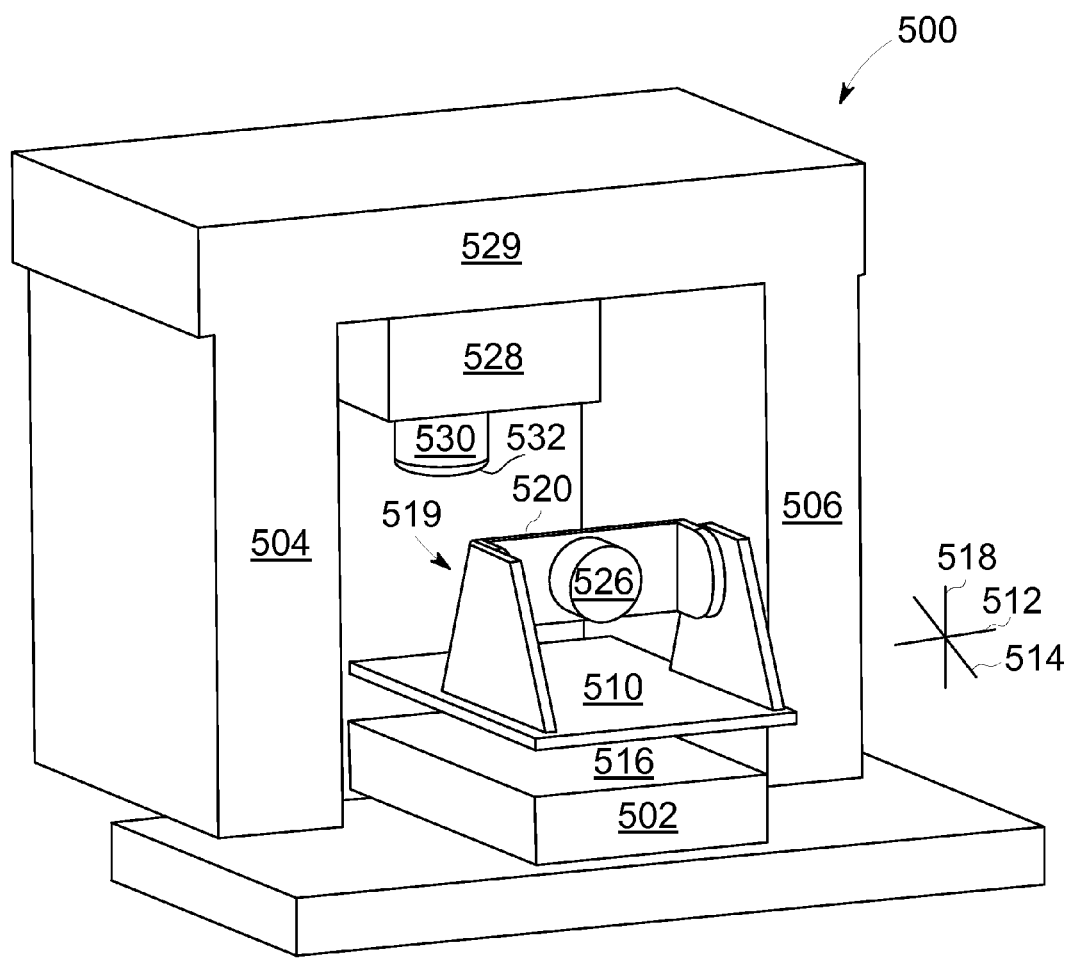
FIG. 5 is a perspective view of an automated multi-axis imaging system that may be used with the non-contact measurement system shown in FIG. 4.

FIG. 5 is a perspective view of an automated multi-axis imager 500 that may be used with non-contact measurement system 400 (shown in FIG. 4). In the exemplary embodiment, multi-axis imager 500 includes a base 502, one or more support legs 504, 506. A cart 510 is supported in movable relation to base 502. Cart 510 is configured to translate in two dimensions 512 and 514 across a face 516 of base 502 and away from and towards base in a third dimension 518. An inspection fixture 519 includes a positioning device 520 mounted to or formed on cart 510. Positioning device 520 is configured to rotate about one or more of axes 512, 514, and 518. Inspection fixture 519 includes a workpiece interface 526 configured to receive a workpiece (not shown), such as, but, not limited to rotor blade 100 (shown in FIG. 1). An imaging device 528, such as a multi-axis imager is positioned on support legs 504 and 506 using for example, a crosspiece 529. Imaging device 528 includes a receiver 530, which in some embodiments includes an optical lens 532. Imaging device 528 is configured to acquire images of rotor blade 100 including surface features of rotor blade 100, such as, but, not limited to cooling holes 108-116 (shown in FIG. 2). In various embodiments, the images are acquired according to a view plan generated by controller 404 (shown in FIG. 4). Multi-axis imager 500 is controllable to position rotor blade 100 in a plurality of positions with respect to imaging device 528 under the direction of the view plan implemented by controller 404. The view plan improves the image acquisition technology by reducing the amount of time an inspection of several hundred cooling holes would otherwise take. The view plan permits acquiring candidate cooling holes via an image scan of rotor blade 100 and then positively matching the candidate cooling holes to cooling holes in the specification data.

In an example, a version of a shaped hole is a cylinder that is intersected by a cone such that the center axis of the cone and the center axis of a cylinder are at a small angle to each other, for example 30 degrees, but still intersect. The intersection of the two shapes forms a non-circular transition line where points on the surface of the material change from being on the surface of a cone and become points lying on the surface of a cylinder. In the example embodiment, these surface points are located by using multi-axis imager 500 to look into cooling holes 108-116 and moving the region focused by along an axis which may be close to, but not necessarily the same as the center axis of either the cone or the cylinder. Images are acquired in a series of steps in this manner, those images containing data points on the hole surface which are sharpely located in the plane of best focus of multi-axis imager 500 by well defined surface texture as well as data points whereby the clarity of the surface structure has been degraded by being out of focus so not in the plane of best focus, and the character of those out of focus surface points are described by the point spread function of the optics of multi-axis imager 500 (point spread function being defined as the manner in which the image of a point changes with distance from the optical system).

To define the cylinder shape, the cone shape, and the transition between the two primitive shapes, the data collected by the images from multi-axis imager 500 provides X, Y, Z coordinates of a minimum number of points on the cylinder surface and the cone surface to uniquely define the shape and position of each. Clearly, three points is insufficient to define the diameter and orientation of the cylinder. As points can only be located on the features surface, the orientation of the cylinder requires significantly more points to identify. For a perfect cylinder it might be argued that 6 points, 3 each on 2 parallel planes, may be enough to define the diameter and orientation of the cylinder, but that would only hold for a perfect cylinder and perfect measurements. If the cylinder is out of round, then the minimum number of points may increase by three on one of the planes for a simple ellipse, assuming the shape does not change along the length. This becomes even more complicated for the cone as both the taper and orientation are unknowns as well as any out of roundness suggesting twelve or more points may be needed for a perfect cone. In actual application, many more points are used to define the shape, size, orientation, and position relative to each other to determine the intersection of the two primitive shapes.

Figure 6:
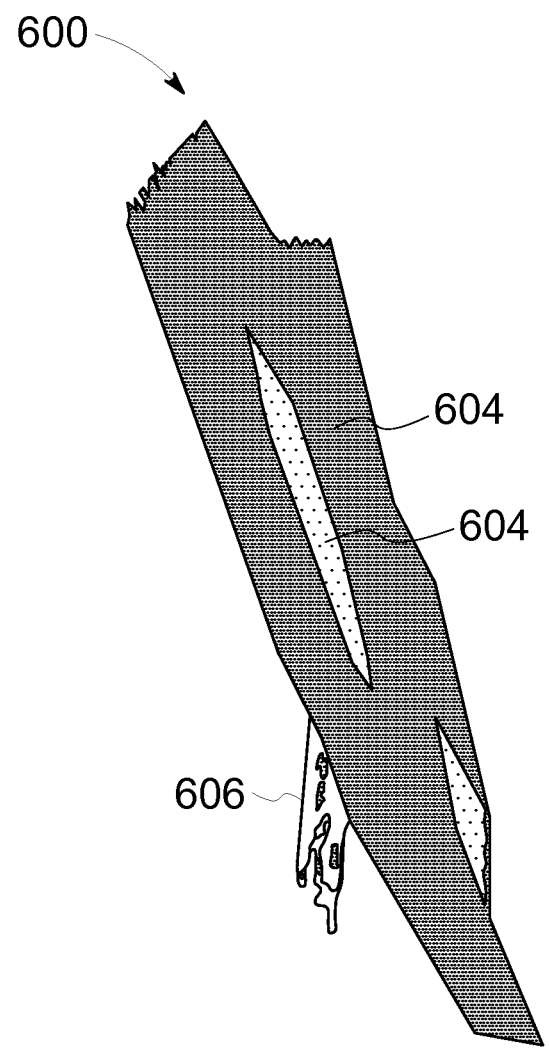
FIG. 6 is a diagram of a plurality of exemplary 3-D position data points of an exemplary diffuser with the cooling holes shown in FIG. 1 meshed as a triangle mesh.

FIG. 6 is a diagram of 3-D point data 600 of one of cooling holes 108-116 (shown in FIG. 2). The feature extraction method described herein is capable of fully automated operation on optical probe 3-D point data by fully utilizing two key additional inputs: (1) interaction of diffuser hole design with optical sensor characteristics; and (2) diffuser hole design information. Rotor blade 100 (shown in FIG. 1) with cooling holes 108-116 to be inspected is held in workpiece interface 526 (shown in FIG. 5) and is at a known location on multi-axis imager 500 (shown in FIG. 5). A location/orientation of cooling holes 108-116 relative to part datums are known from their design data, which may be stored in memory device 420 (shown in FIG. 4) for use by one or more processors 418 (shown in FIG. 4). Using this data, an automated inspection program orients the part under imaging device 528 while generating the 3-D point data of the cooling hole being inspected. While the machined locations of cooling holes 108-116 are subject to manufacturing variation, the feature extraction algorithm reduces its 3-D search within the measurement volume to a small zone slightly larger than the cooling hole positional tolerance, utilizing the same design data required for part inspection. Thus, no additional burden is placed on the inspection procedure, while the algorithm search space is drastically reduced. Next, the 3-D point data is tessellated to create a plurality of triangle faces in edge-to-edge tiling (not shown) representing a surface 602 of blade 100, a surface 604 of meter portion 124 and/or a surface 606 of diffuser portion 126. The cooling hole boundary polyline segments 602 are illustrated in FIG. 6 (discussed further below).

Figure 7:
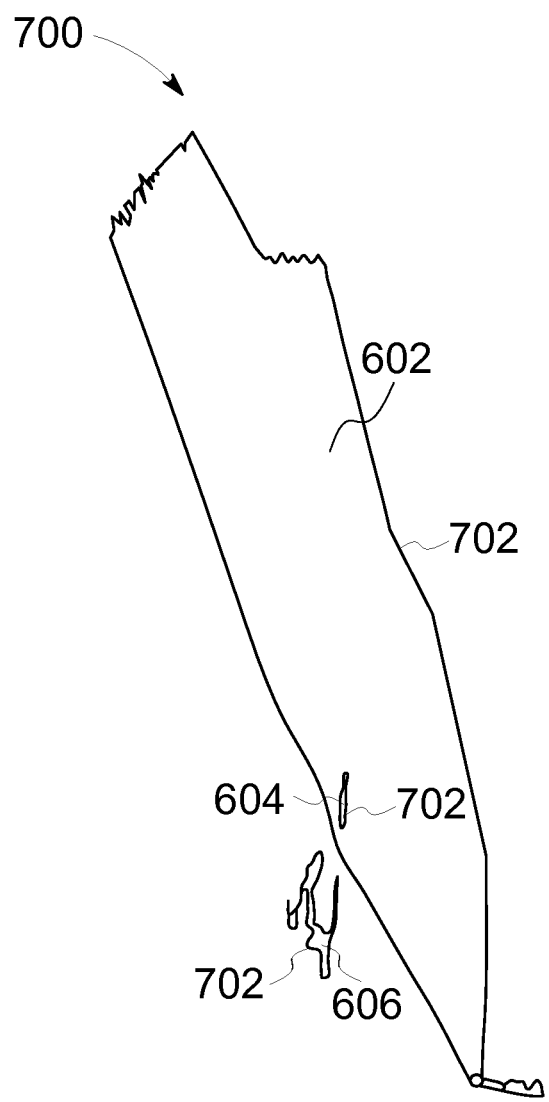
FIG. 7 is an exemplary boundary curve points of 3-D point cloud of data extracted from a plurality of images for one of the cooling holes shown in FIG. 1.

FIG. 7 is an outline of boundary points 700 extracted from a plurality of images for one of cooling holes 108-116 (shown in FIG. 2). Each point of the 3-D point data represents an intersection of a view plane or focal plane 140-152 (shown in FIG. 4) that is in focus when the image was acquired and sidewall 134 or 136 (shown in FIGS. 2, 3, and 4). The boundaries of the 3-D point data are shown as polyline segments 602. The triangle faces share boundary edges with each other except for free edges 702 where triangle faces do not have any common neighbors. Determining free edges 702 permits identifying boundaries of each surface 602, 604, and 606 (shown in FIG. 6).

Figure 8:
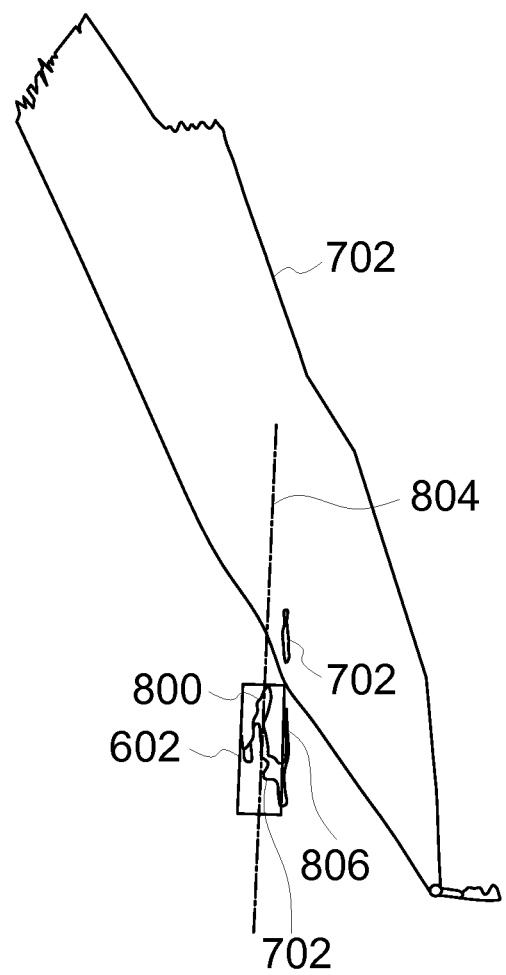
FIG. 8 is a diagram of exemplary bottom boundary points used to construct a meter portion axis estimate.

FIG. 8 is a diagram of exemplary bottom boundary points 800 used to construct a cylinder axis estimate 804 of a cylindrically-shaped meter portion 806. Polyline segments 602 of free edges form the boundary segments. A key aspect of optical systems, such as, non-contact measurement system 400 (shown in FIG. 4) is that they only provide line of sight data. Non-line of sight data inside cooling holes 108-116 (shown in FIG. 2), such as corners of internal cavity 122, are not measured. Thus free boundaries in the tessellated data are found inside the cooling hole at the bottom where line of sight terminates into internal cavity 122. Owing to the typical design of diffuser portion 126 wherein a bottom section of diffuser portion 126 adjacent to meter portion 124 is normally cylindrical, the bottom free boundary measurement points lie approximately on a cylindrical surface. Using these points as an estimate, the actual cooling hole orientation position and diameter of cooling holes 108-116 is computed.

Figure 9:
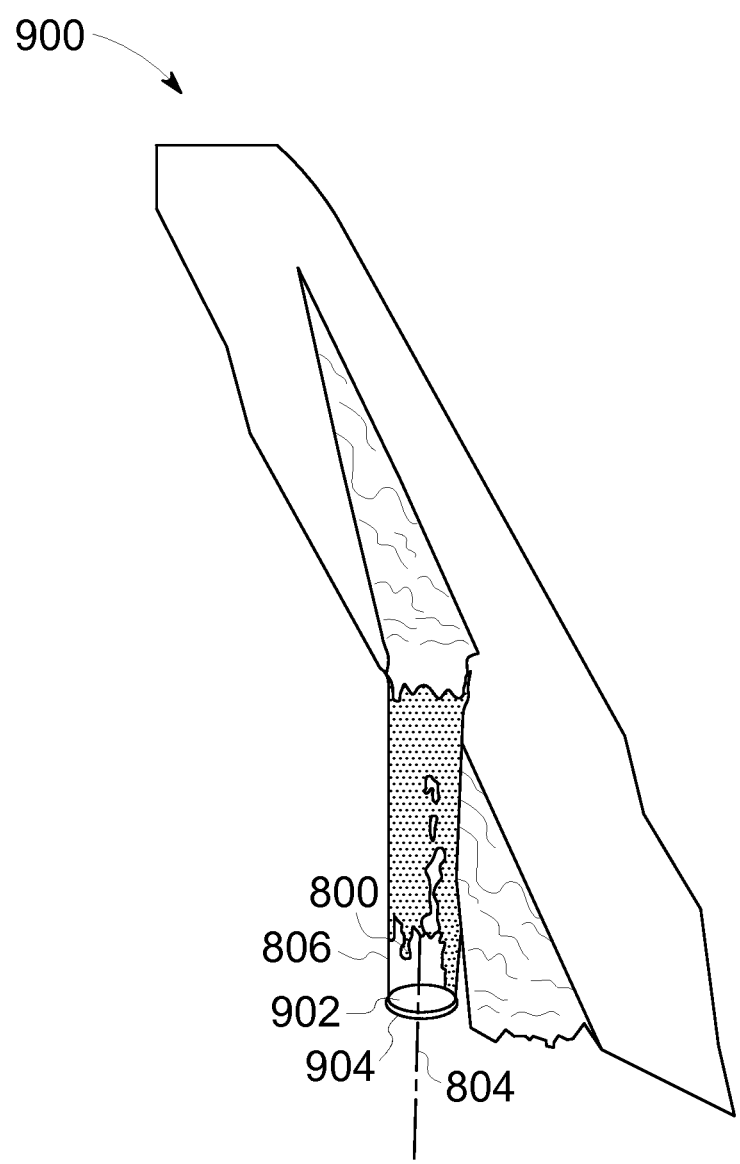
FIG. 9 shows that all 3-D position data points within a distance threshold value relative to the estimated meter portion shape are extracted to further refine the meter portion axis estimation.

FIG. 9 shows that all 3-D position data points 900 within an inner radial threshold value 902 and an outer radial threshold value 904 relative to estimated cylinder 806 are extracted to further refine the cylinder axis estimation.

Figure 10:
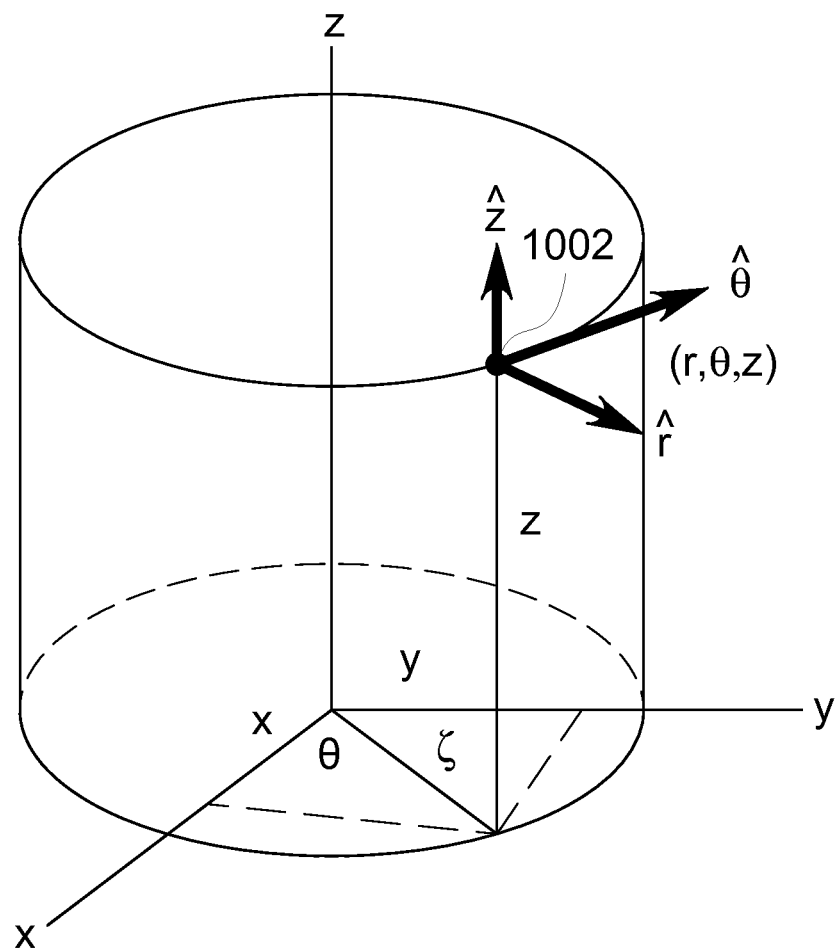
FIG. 10 shows that the 3-D (x,y,z) Cartesian coordinates of these extracted points are mapped into an exemplary 3-D cylindrical coordinate representation (r, θ, z)

FIG. 10 shows that the 3-D (x,y,z) Cartesian coordinates of these extracted points are mapped into a 3-D cylinder coordinate representation (r, theta (θ), z). Cylindrical coordinates are a generalization of two-dimensional polar coordinates to three dimensions by superposing a height (z) axis. A point is space 1002 represented by Cartesian coordinates (x,y,z) is represented in the cylindrical coordinate system using:

In terms of the Cartesian coordinates (x,y,z), $$r=\sqrt{x^2+y^2}, \quad \text{Eq. (1)}$$

$$\tan\theta = y/x, \text{ and} \quad \text{Eq. (2)}$$

$$z=z, \quad \text{Eq. (3)}$$

where r∈(0,∞), theta ∈[0,2π), z ∈(−∞,∞), and the inverse tangent must be suitably defined to take the correct quadrant of (x,y) into account.

In terms of x, y, and z, $$x=r\cos\theta, \quad \text{Eq. (4)}$$

$$y=r\sin\theta, \text{ and} \quad \text{Eq. (5)}$$

$$z=z. \quad \text{Eq. (6)}$$

Although described herein as being cylindrical in shape, it should be understood that meter portion 124 may be any axi-symmetric shape, for example, but not limited to, conical, elliptical, or combinations thereof. In such cases where meter portion 124 is conical, elliptical, or conical-elliptical, r in Eq. 1, would be a function of z as well as x and y. Meaning that the radius changes along the z-axis rather than being constant along the z-axis in the case where meter portion 124 is cylindrical.

Figure 11:
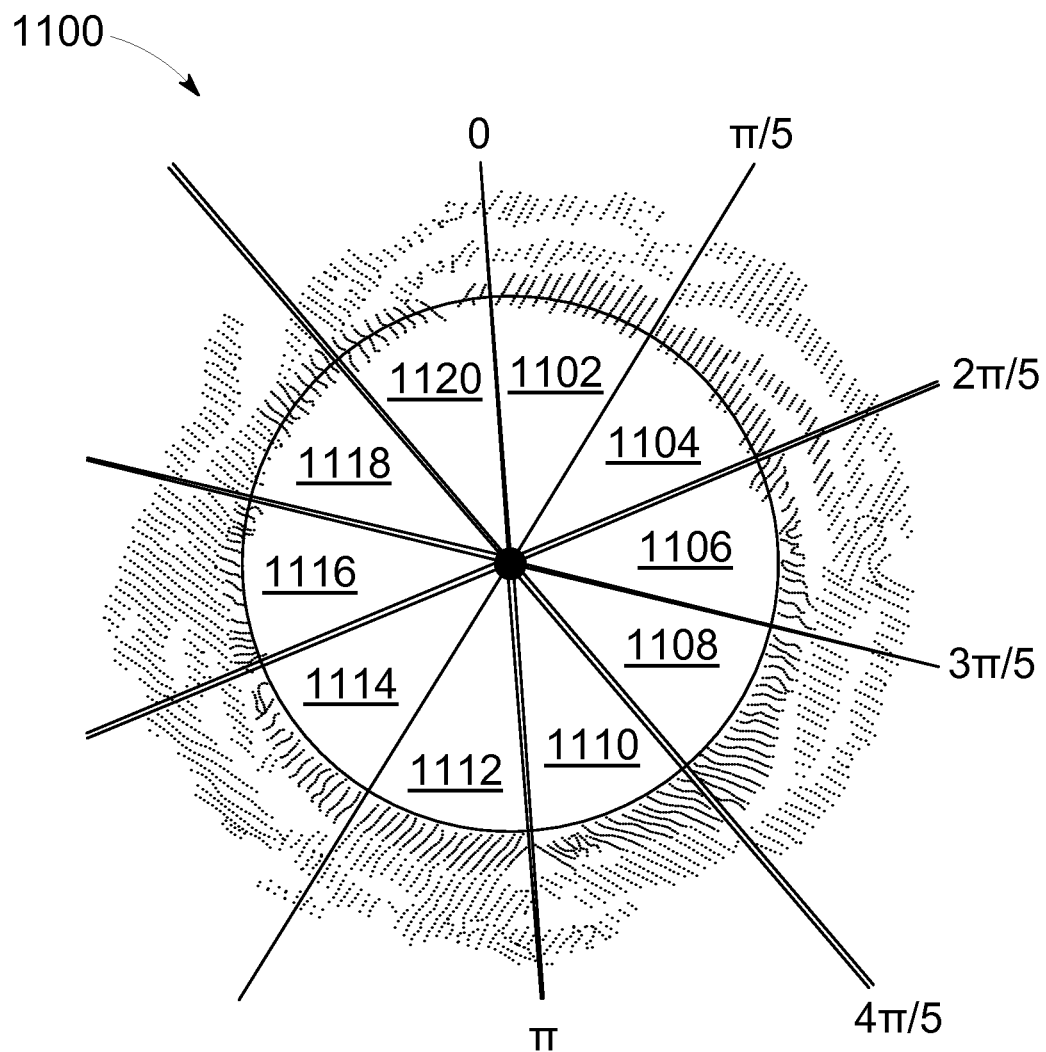
FIG. 11 shows that based on their theta (θ)-values, points are assigned into theta (θ) bins.

FIG. 11 shows a plurality of θ bins 1100. Based on their theta (θ)-values, points are assigned into theta (θ) bins, 1102, 1104, 1106, 1108, 1110, 1112, 1114, 1116, 1118, and 1120.

Figure 12:
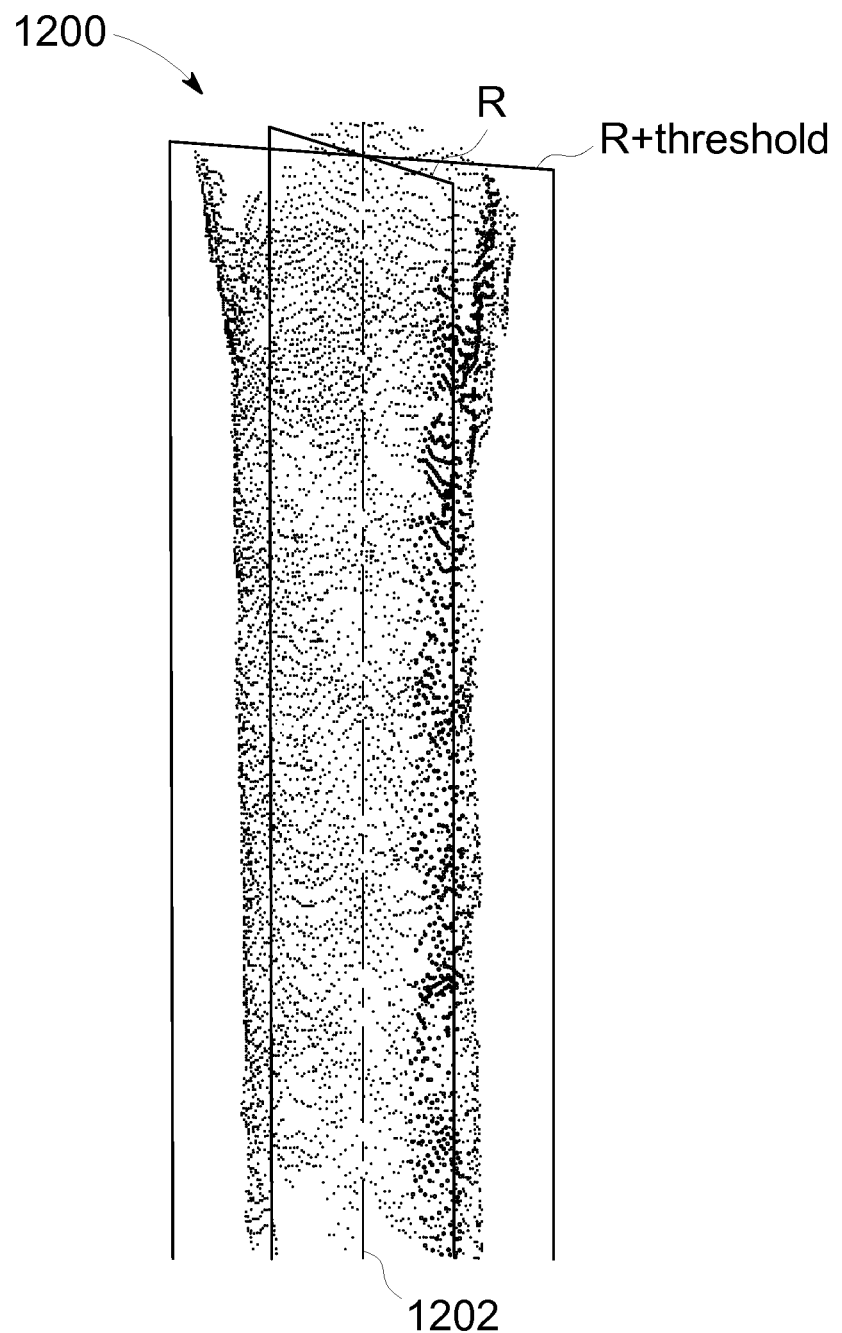
FIG. 12 shows that within each theta (θ) bin starting with the point having the highest z-value, their r-values are compared with an estimated cylinder radius within a threshold. Those having r-values within the estimated cylinder radius are retained, and the remainder are discarded.

FIG. 12 shows a final extraction 1200 of cylinder points within each θ bin. A radius of the cylinder points is determined from a cylinder axis 1202. Within each theta (θ) bin, starting with the point having the highest z-value, the point r-values are compared with an estimated cylinder radius within a threshold. Those having r-values within the estimated cylinder radius are retained, and the remainder are discarded.

Figure 13:
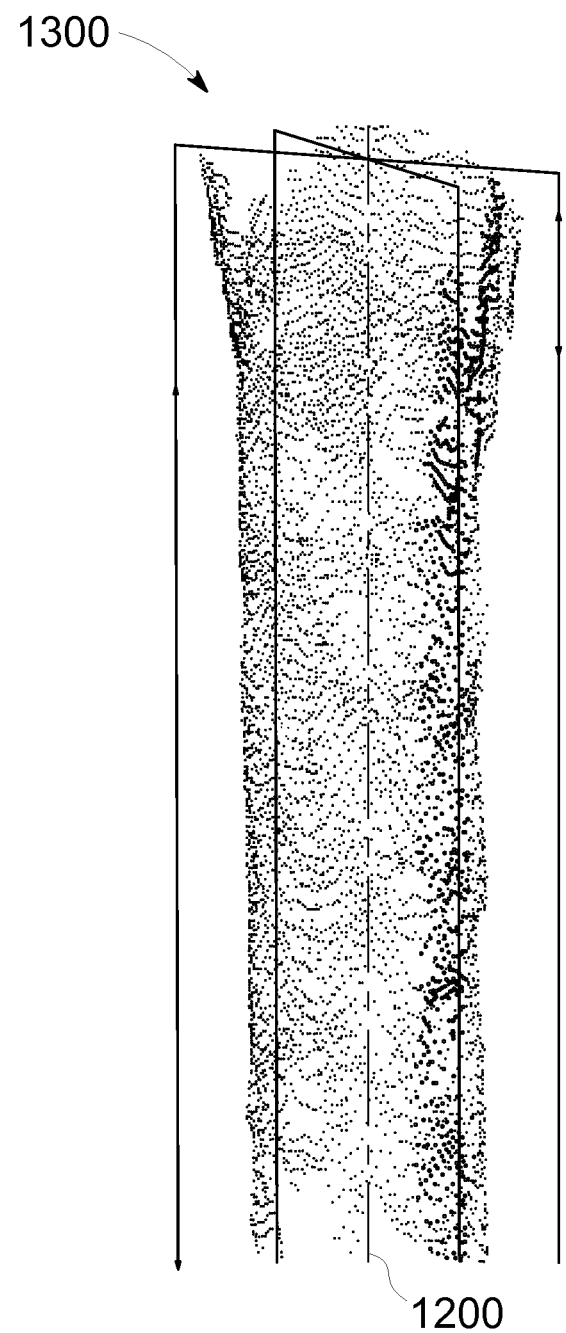
FIG. 13 shows that the point sorting is performed by noting that the general shape of diffuser holes transition from cylindrical on the coolant side to non-cylindrical on the hot gas side.

FIG. 13 shows points in a bin 1300, sorted along a length of cylinder axis 1200 where the point sorting is performed by noting that the general shape of cooling holes 108-116 diffuser holes transition from cylindrical on the coolant side of airfoil 102 (shown in FIG. 1) to non-cylindrical on the hot gas side of airfoil 102.

Figure 14:
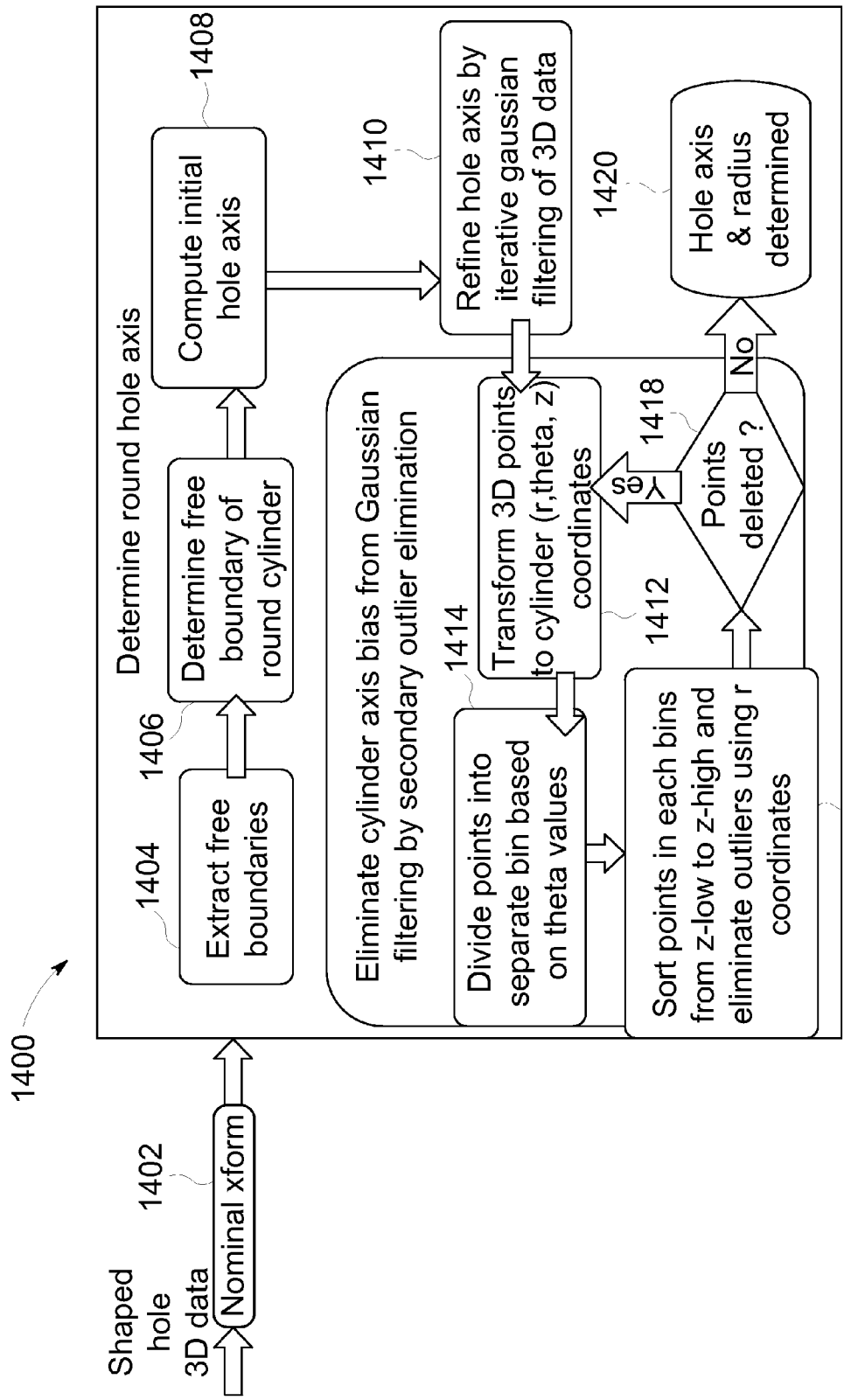
FIG. 14 is a flow diagram of a method of determining an axis and radius of a plurality of cooling holes that may be used with non-contact measurement system shown in FIG. 4.

FIG. 14 is a flow diagram of a method 1400 of determining an axis and radius of a plurality of cooling holes 108-116 (shown in FIG. 2) that may be used with non-contact measurement system 400 (shown in FIG. 4). In the exemplary embodiment, method 1400 includes receiving 1402 3-D point data for cooling holes 108-116. The 3-D point data may be received in real time during an acquisition of the data or the 3-D point data may be retrieved from memory device 420. The free boundaries are extracted 1404, and a free boundary of a cylinder is determined 1406. In various embodiments, the determined free boundaries and the specification data for rotor blade 100 and cooling holes 108-116 are used to determine a blocked hole condition. A blocked hole condition may exist if during the manufacturing or other process leaves an amount of material in the cooling hole. The cooling hole being blocked negates the cooling hole function of providing a flow of fluid from within blade 100 to the surface of blade 100. In other embodiments, 3-D point data that was discarded when estimating the cylinder boundary may also be used to determine or verify a blocked cooling hole. If the determined hole bottom boundary is found to be in an unexpected location, for example, the cooling hole is too short, it may be an indication that imaging device 528 is not properly positioned to view down meter portion 124 a sufficient distance. The determined hole bottom boundary in the unexpected location may also be an indication that the hole is blocked. This can be verified using the data points that were not within the threshold tolerance when determining the cylinder radius. The points were discarded as being potential outliers, but may actually been providing an accurate indication of a blocked cooling hole. Using the short bottom boundary determination and the discarded cylinder 3-D data points together can be used to notify a user of the blocked hole and/or verify a previously determined blocked cooling hole.

An initial hole axis is computed 1408 and the initial hole axis is refined 1410 by an iterative Gaussian filtering of the 3-D point data. A cylinder axis bias is eliminated from the Gaussian filtering by a secondary outlier elimination, which includes transforming 1412 the 3-D position data points from a Cartesian representation to a cylinder coordinate representation (r, θ, z), dividing 1414 the points into separate bins based on their θ-value, and sorting 1416 points in each bin from, for example, a z-low value to a z-high value and eliminating outliers using r coordinates. Method 1400 determines 1418 whether points were deleted or not. If points were deleted, method 1400 returns to step 1412 to again eliminate cylinder axis bias from the Gaussian filtering. If no points were deleted, method 1400 outputs 1420 the determined hole axis and radius.

Figure 15:
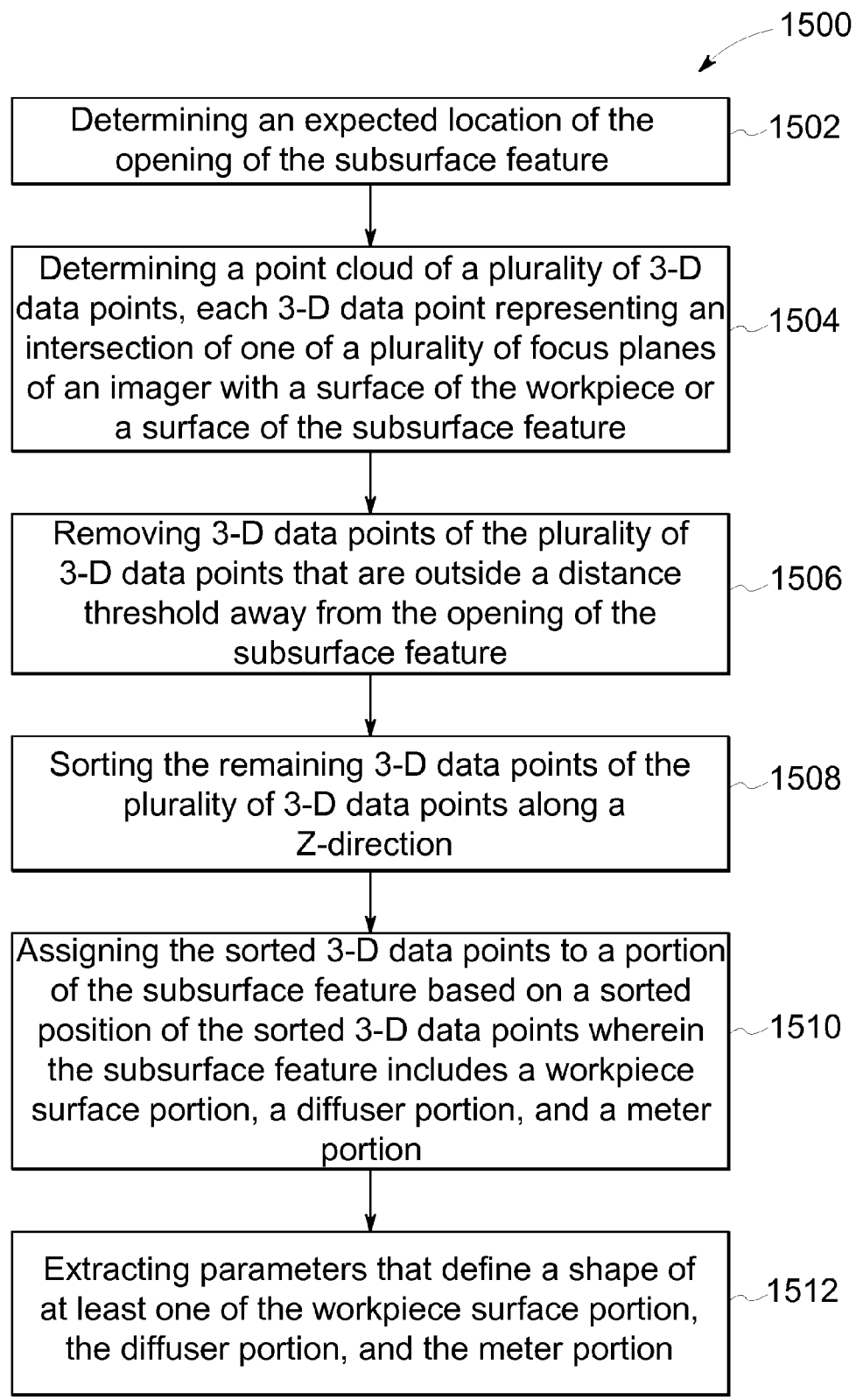
FIG. 15 is a flow diagram of a method of determining a boundary of a subsurface feature having an opening to a surface of a workpiece.

FIG. 15 is a flow diagram of a method 1500 of determining a boundary of a subsurface feature having an opening to a surface of a workpiece. In the exemplary embodiment, method 1500 includes determining 1502 an expected location of the opening of the subsurface feature and determining 1504 a point cloud of a plurality of 3-D data points wherein each 3-D data point represents an intersection of one of a plurality of focus planes of an imager with a surface of the workpiece or a surface of the subsurface feature. Method 1500 also includes removing 1506 3-D data points of the plurality of 3-D data points that are outside a distance threshold away from the opening of the subsurface feature and sorting 1508 the remaining 3-D data points of the plurality of 3-D data points along a z-direction. Method 1500 further includes assigning 1510 the sorted 3-D data points to a portion of the subsurface feature based on a sorted position of the sorted 3-D data points wherein the subsurface feature includes a workpiece surface portion, a diffuser portion, and a meter portion and extracting 1512 parameters that define a shape of at least one of the workpiece surface portion, the diffuser portion, and the meter portion.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely exemplary or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

While the disclosure has been described in terms of various specific embodiments, it will be recognized that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof, the technical effect of the methods and systems may be achieved by performing at least one of the following steps: (a) receiving 3-D position data for points acquired from each cooling hole, each cooling hole including an approximately cylindrical meter portion 124 and a non-cylindrical diffuser portion, (b) extracting free boundaries of a tessellated shape representing a surface of meter portion 124 and the diffuser, (c) determining a free boundary of a cylinder using the extracted free boundaries, (d) determining an initial hole axis using the determined free boundary of the cylinder, (e) refining the initial hole axis using an iterative Gaussian filtering of the 3-D point data, (f) eliminating a cylinder axis bias from the Gaussian filtering by a secondary outlier elimination, (g) outputting a determined hole axis and radius. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of measuring dimensional parameters of surface and subsurface features of an object provides a cost-effective and reliable means generating a view plan for features to be measured, implementing the view plan to generate view data, and analyzing the view data to generate dimensional data for the features. More specifically, the methods and systems described herein facilitate extracting features of a meter portion 124 of cooling holes 108-116. In addition, the above-described methods and systems facilitate extracting features of a shaped diffuser of cooling holes 108-116 and proximate a surface of the object. In addition, the above-described methods and systems facilitate transforming point cloud data of the extracted features into dimensional data that can be compared to an electronic representation of the object to determine a quality of fabrication and operation. As a result, the methods and systems described herein facilitate automatically inspecting and measuring features in an object in a cost-effective and reliable manner.

An exemplary technical effect of the methods, systems, and apparatus described herein includes at least one of: (a) obtaining a 3-D map of the cooling hole; (b) faster data collection for inspecting cooling holes; and (c) the ability to use smaller cooling holes effectively for part cooling, where such smaller, designed cooling holes provide better part life, higher airfoil efficiency for better turbine fuel efficiency, and reduced maintenance cost. Additionally, the 3-D map obtain does not need to be a complete map. Using line of sight sensors, such as, imaging device 528 may not collect data from every surface of the cooling holes. However, the shape of the cooling hole is still determined using the 3-D point data that is collected. The determined shape is then compared to the specification data for rotor blade 100 and cooling holes 108-116. Only the amount of data of the surfaces of the cooling holes is compared to the specification data for rotor blade 100 and cooling holes 108-116. Any data that is missing is not used in the comparison. A threshold for a minimum amount of data can also be determined to provide a desired level of certainty of the surface measurements.

The feature extraction technique described herein is more robust compared to other general techniques. Currently available generic techniques for identifying cylindrical or axi-symmetric features in 3-D point data, such as curvature based segmentation, computing gauss map of the point clouds and using RANSAC algorithm based segmentation do not provide adequate robustness and accuracy for identifying segments of as-manufactured cooling holes. No sensor or design information is utilized in these existing general techniques. Furthermore complete automation is difficult to achieve with these existing methods due to the need for operator interpretation because point clouds of as-manufactured cooling holes present three challenges: surface roughness, non-roundness of cooling hole data and optical noise. The principles of operation described herein may be applied for automated feature extraction of cooling holes machined into a wider range of components such as nozzles, vanes, combustors, blades and buckets.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Exemplary methods and apparatus for automatically determining the physical dimensions of features of an object using point cloud data derived from images of the object are described above in detail. The apparatus illustrated is not limited to the specific embodiments described herein, but rather, components of each may be utilized independently and separately from other components described herein. Each system component can also be used in combination with other system components.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An automated measurement system comprising:
a multi-axis imager configured to:
receive images of a workpiece, the images including at least one of visual information about the workpiece at a plurality of focus planes and visual information about the workpiece between at least two focus planes;
determine a point cloud of a plurality of 3 D data points, each of the plurality of 3 D data points representing at least one of an intersection of one of the plurality of focus planes with a surface of the workpiece and positional information of the workpiece in a de-focused area between the at least two focus planes;
determine, using the point cloud of the plurality of 3 D data points, a plurality of dimensions of features of the workpiece;
compare the determined plurality of dimensions of the features to manufacturing specifications corresponding to at least some of the determined plurality of dimensions of the features; and
output an indication of at least the comparisons that exceed a predetermined threshold.

2. The system of claim 1, further comprising a fixture comprising:
a workpiece interface configured to receive a workpiece, the workpiece including surface features and subsurface features having predetermined positions and dimensions; and
a positioning device configured to at least one of rotate the workpiece about at least one axis of said fixture and translate the workpiece along a path.

3. The system of claim 2, wherein said multi-axis imager comprises a line-of-sight imaging device comprising a receiver, said multi-axis imager configured to receive images of the workpiece from a plurality of view angles, each view angle of the plurality of view angles determined by a relative position of the workpiece and said receiver of said multi-axis imager.

4. The system of claim 3, further comprising a controller configured to:
receive an electronic representation of the workpiece;
determine a view plan for performing an inspection of surface features and subsurface features using said multi-axis imager and based on the received electronic representation of the workpiece, the view plan including a determined route for viewing one or more surface features and subsurface features using said multi-axis imager;
automatically position the workpiece in accordance with the view plan;
automatically acquire images of each surface feature and subsurface feature in the view plan at a plurality of view planes;
generate a 3 Dimensional (3 D) point cloud of each surface feature and subsurface feature using the acquired images, the 3-D point cloud including a plurality of 3-D position data points; and
determine dimensions of the surface features and subsurface features using the generated point cloud.

5. The system of claim 4, wherein the surface features and subsurface features define cooling holes in a turbine blade.

6. The system of claim 4, wherein the determined view plan includes instructions for positioning, in turn, each of the surface features and subsurface features relative to said receiver of said multi-axis imager.

7. The system of claim 4, wherein the surface features include a diffuser portion and the subsurface features include a bore extending from the diffuser portion into the workpiece, the bore defining a centerline extending therethrough and wherein the determined view plan includes instructions for positioning, in turn, each of the bores non-orthogonally relative to said receiver of said multi-axis imager.

8. The system of claim 4, wherein said controller is further configured to tessellate the 3 D position data points to create a mesh of triangle faces representing a sidewall of the diffuser portion.

9. The system of claim 8, wherein at least a portion of the triangle faces of the mesh of triangle faces share boundary edges with each other except for the free edges where triangle faces do not have any common neighbors and polyline segments of free edges form boundary segments of the mesh of triangle faces.

10. The system of claim 8, wherein said controller is further configured to:
tessellate the 3 D position data points inside the surface features and subsurface features at a bottom section of the diffuser portion where a line of sight of said multi-axis imager terminates into an internal cavity of the work piece;
estimate bottom free boundary measurement points beyond the line of sight of said multi-axis imager using free boundaries in the tessellated data;
determine an actual orientation position and diameter of the surface features and subsurface features using the estimate of bottom free boundary measurement points; and
estimate an axi-symmetric shape and a shape axis from the determined actual orientation position and diameter of the surface features and subsurface features.

11. The system of claim 10, wherein said controller is further configured to:
extract all 3 D position data points within a distance threshold value relative to the estimated axi-symmetric shape to further refine the estimation of the shape axis;
map the 3 D Cartesian coordinates (x,y,z) of the extracted points into 3 D cylinder coordinates (r, θ, z), thereby defining a plurality of r-values; and
assign the points into one of a plurality of θ bins based on their θ-values.

12. The system of claim 11, wherein said controller is further configured to:
compare the r-values of the points in each of the plurality of θ bins to the estimated axi-symmetric shape radius within a threshold, starting with the point having the highest z-value and continuing with all points in descending order of z value;
retain the points having r values within the threshold of the estimated axi-symmetric shape radius; and
discard the remainder of the points.

13. The system of claim 1, wherein the features of the workpiece comprise surface features and subsurface features having predetermined positions and dimensions.

14. The system of claim 1, wherein said multi-axis imager is further configured to:
   receive an electronic representation of a lens of the multi-axis imager; and
   determine the plurality of 3 D data points representing positional information of the workpiece in a de-focused area between the at least two focus planes using the electronic representation of the lens.

15. A computer-implemented method for automatically measuring dimensional parameters of a plurality of shaped cooling holes, the method implemented using a computer device coupled to a user interface and a memory device, the method comprising:
   receiving 3-Dimensional (3 D) position data points from each cooling hole, each cooling hole including an approximately axi-symmetric shaped meter portion and a non-cylindrical diffuser portion;
   extracting free boundaries of a tessellated shape representing a surface of a sidewall of the approximately axi-symmetric shaped meter portion and the non-cylindrical diffuser portion;
   determining a free boundary of an axi-symmetric shape using the extracted free boundaries;
   determining an initial cooling hole axis using the determined free boundary of the axi-symmetric shape;
   refining the initial cooling hole axis using an iterative Gaussian filtering of the 3 D position data points;
   eliminating an axis bias from the Gaussian filtering by a secondary outlier elimination; and
   outputting a determined cooling hole axis and radius.

16. The method of claim 15, further comprising determining an axis and a radius of a plurality of cooling holes in a gas turbine engine blade.

17. The method of claim 15, further comprising at least one of receiving the 3 D position data points in real time during an acquisition of the data and retrieving stored 3 D position data points from the memory device.

18. The method of claim 15, wherein eliminating an axis bias from the Gaussian filtering by a secondary outlier elimination comprises:
   (a) transforming the 3 D position data points from a Cartesian representation to a cylinder coordinate representation (r, θ, z);
   (b) dividing the 3 D position data points into separate bins based on a value of the 3 D position data point θ-value;
   (c) sorting the 3 D position data points in each bin based on a z-value of the 3 D position data points;
   (d) eliminating outliers in the sorted 3 D position data points using an r value of each 3 D position data point;
   (e) determining whether any of the sorted 3 D position data points were eliminated;
   (f) if any of the sorted 3 D position data points were eliminated, returning to step (a); and
   (g) if none of the sorted 3 D position data points were eliminated, outputting the determined cooling hole axis and radius.

19. The method of claim 18, wherein eliminating outliers using an r value of each 3 D position data points comprises comparing the r value of each 3 D position data point to an estimated radius of the cylinder.

20. One or more non-transitory computer-readable storage media having computer-executable instructions embodied thereon, wherein when executed by at least one processor, the computer-executable instructions cause the processor to:
   receive an electronic representation of a workpiece including one or more surface features and subsurface features;
   determine a view plan for performing an inspection of the surface features and subsurface features using the multi-axis imager and based on the received electronic representation of the workpiece, the view plan including a determined route for viewing one or more surface features and subsurface features using said multi-axis imager;
   position the workpiece in accordance with the view plan;
   acquire images of each surface feature and subsurface feature in the view plan at a plurality of view planes;
   generate a 3 Dimensional (3 D) point cloud of each surface feature and subsurface feature using the acquired images, the 3-D point cloud including a plurality of 3-D position data points; and
   determine dimensions of the surface features and subsurface features using the generated point cloud.

21. The computer-readable storage media of claim 20, wherein the surface features include a diffuser portion, the computer-executable instructions further cause the processor to triangulate the 3 D position data points to create a mesh of triangle faces representing a sidewall of the diffuser portion.

22. The computer-readable storage media of claim 20, wherein triangle faces of the mesh of triangle faces share boundary edges with each other except for the free edges where triangle faces do not have any common neighbors and polyline segments of free edges form boundary segments of the mesh of triangle faces.

23. The computer-readable storage media of claim 20, wherein said controller is further configured to:
   tessellate the 3 D position data points inside the surface features and subsurface features at a bottom section of the diffuser portion where a line of sight of said multi-axis imager terminates into the internal cavity;
   estimate bottom free boundary measurement points beyond a line of sight of said multi-axis imager using free boundaries in the tessellated data; and
   determine an actual orientation position and diameter of the surface features and subsurface features using the estimate.

24. The computer-readable storage media of claim 20, wherein said controller is further configured to:
   extract all 3 D position data points within a distance threshold value relative to an estimated cylinder to further refine an estimation of the cylinder axis;
   map the 3 D Cartesian coordinates (x,y,z) of the extracted points into 3 D cylinder coordinates (r, θ, z), thereby defining a plurality of r-values; and
   assign the points into θ bins based on their θ-values.

25. The computer-readable storage media of claim 20, wherein said controller is further configured to:
   compare the r-values of the points in each θ bin to the estimated cylinder radius within a threshold, starting with the point having the highest z-value and continuing with all points in descending order of z value;
   retain the points having r values within the threshold of the estimated cylinder radius; and
   discard the remainder of the points.

* * * * *